United States Patent [19]
Choi

[11] Patent Number: 5,495,660
[45] Date of Patent: Mar. 5, 1996

[54] APPARATUS FOR INSERTING ROTATION SHAFT OF SMALL-SIZED MOTOR INTO GEAR

[75] Inventor: Young Suk Choi, Seoul, Rep. of Korea

[73] Assignee: Daewoo Electronics Co., Ltd., Seoul, Rep. of Korea

[21] Appl. No.: 297,216

[22] Filed: Aug. 29, 1994

[30] Foreign Application Priority Data

Aug. 28, 1993 [KR] Rep. of Korea ................. 93-16926
Aug. 30, 1993 [KR] Rep. of Korea ................. 93-16975
Aug. 30, 1993 [KR] Rep. of Korea ................. 93-16990

[51] Int. Cl.$^6$ ........................... H02K 15/00; B23P 19/04
[52] U.S. Cl. ................. 29/732; 29/251; 29/252; 29/893.1; 29/893.2
[58] Field of Search ............... 29/251, 252, 276, 29/257, 732, 760, 893.1, 893.2; 72/446, 470; 100/231; 310/83; 279/404

[56] References Cited

U.S. PATENT DOCUMENTS

| | | | |
|---|---|---|---|
| 3,100,438 | 8/1963 | Merker | 100/231 X |
| 3,191,259 | 6/1965 | Dalton | 29/252 X |
| 4,214,465 | 7/1980 | Rode | 72/446 X |
| 4,587,450 | 5/1986 | Ozaki | 310/83 X |
| 5,323,530 | 6/1994 | Goto et al. | 29/893.1 X |
| 5,333,377 | 8/1994 | Phillips | 29/893.2 |

FOREIGN PATENT DOCUMENTS

| | | | |
|---|---|---|---|
| 6218633 | 8/1994 | Japan | 29/893.2 |
| 1181845 | 9/1985 | U.S.S.R. | 29/251 |
| 149682 | 7/1989 | U.S.S.R. | 29/251 |
| 578425 | 6/1946 | United Kingdom | 29/251 |

*Primary Examiner*—Peter Vo
*Attorney, Agent, or Firm*—Nixon & Vanderhye

[57] ABSTRACT

An apparatus for inserting a shaft of a small-sized motor into a gear has a hand press which includes a substrate, a handle and a chuck. The chuck has a cylindrical housing into which a motor fixing member is inserted, a piston between an inner upper portion of the housing and an upper portion of the motor fixing member. The motor fixing member receives a motor and supports a rear portion of the motor when pushing force is directed from an upper portion of the piston by a spring. A pushing force is applied to the piston by rotating an external lever.

10 Claims, 10 Drawing Sheets

FIG. 2
FIG. 3
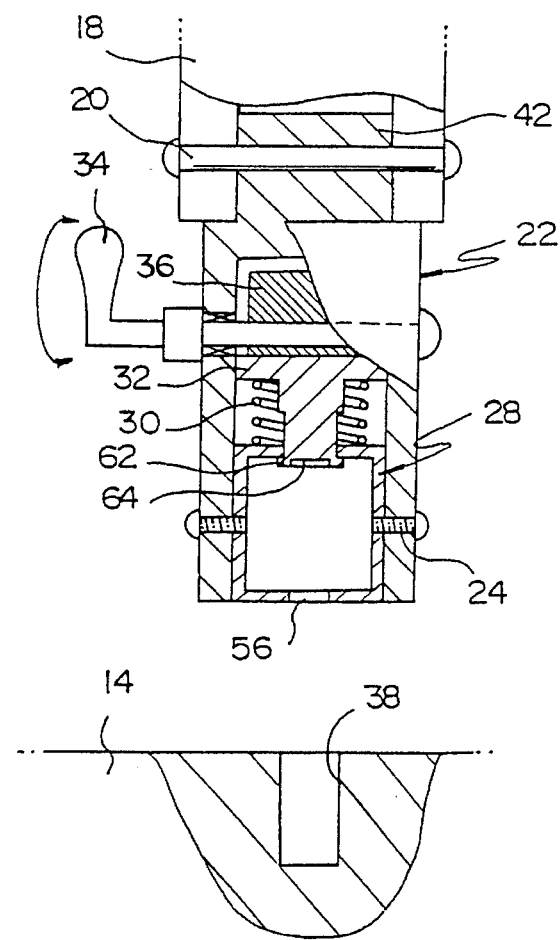
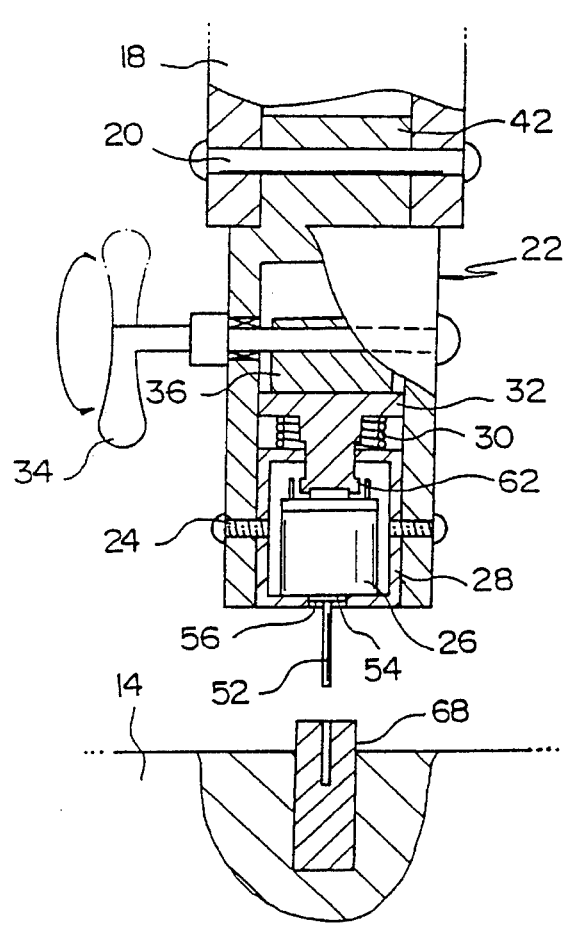

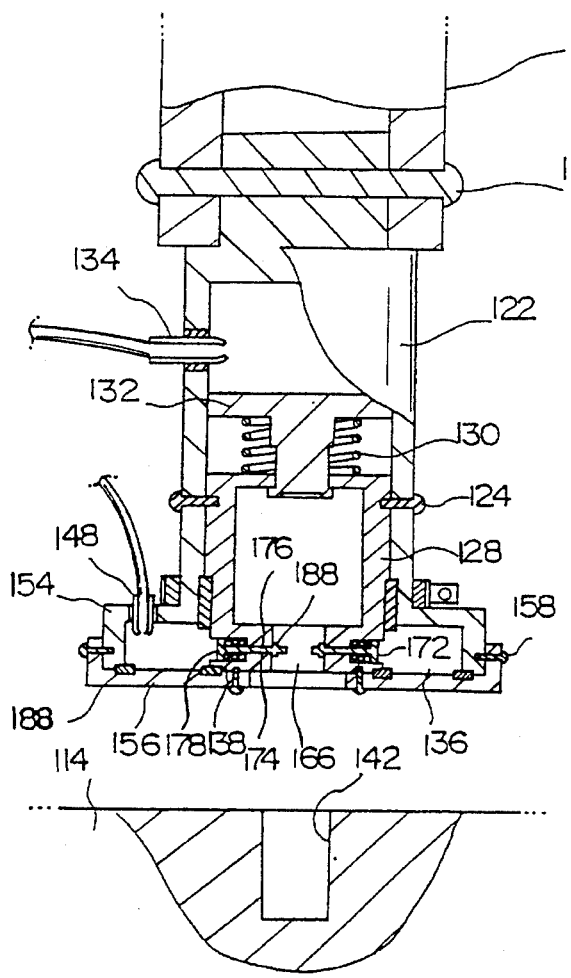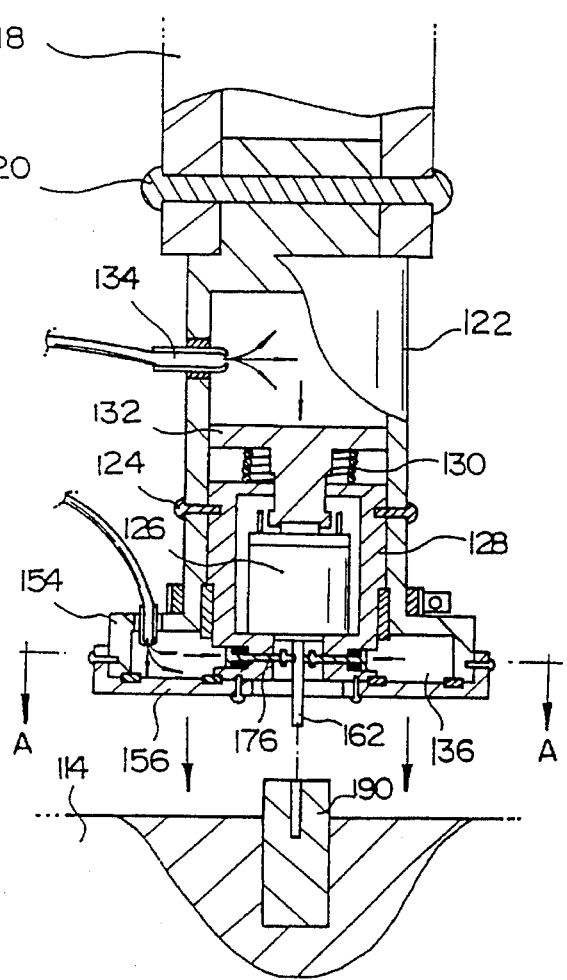

FIG. 11
FIG. 12
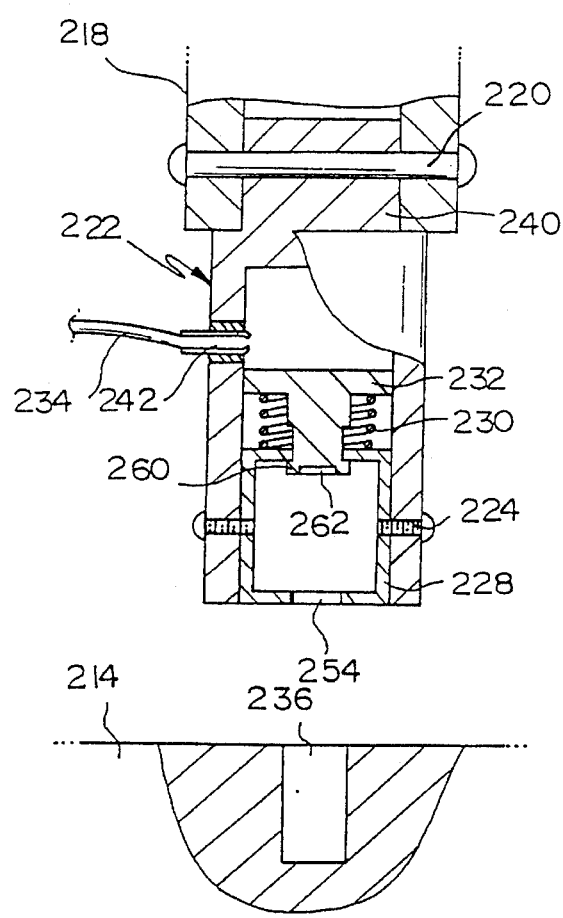
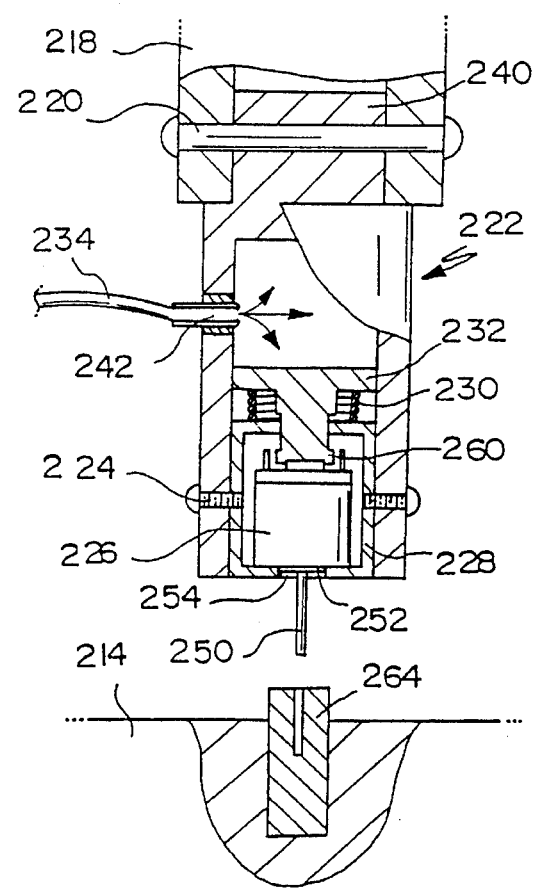

APPARATUS FOR INSERTING ROTATION SHAFT OF SMALL-SIZED MOTOR INTO GEAR

BACKGROUND OF THE INVENTION

1. Field of the Invention

The present invention relates to an apparatus for inserting a rotation shaft of a small-sized motor into a gear, and more particularly to an apparatus for inserting simply a rotation shaft of a small-sized motor such as feeding motor which is adapted to a pick-up unit in a disc player into a gear.

2. Prior Art

Conventionally, in order to insert a rotation shaft of a small-sized motor used as a pick-up driving unit in a mini-disc player into a gear, while catching the gear by means of hands or a tool such as a gig, a fixed rotation shaft was manually inserted into the gear. In this case of inserting the rotation shaft of the motor into the gear manually, a misalignment of the centers of the shaft and gear occurs undesirably to cause a misoperation of the apparatus using the shaft and the gear which requires a precise operation. Further, when using the gig in order to insert the shaft into the gear, there is a high probability that the teeth of the gear may be damaged.

SUMMARY OF THE INVENTION

Accordingly, it is an object of the present invention to provide an apparatus for simply inserting the rotation shaft of small-sized motor into the gear without any damage.

To accomplish the above object of the present invention, in accordance with one embodiment of the present invention, there is provided an apparatus for inserting a shaft of a motor into a gear, the apparatus comprising:

a hand press having a substrate with a bottom portion, a vertical portion and a ceiling portion, a chuck suspended by the ceiling portion and a handle for moving the chuck in an up/down direction attached to the substrate;

a means for fixing a gear formed on the bottom portion of the hand press;

a cylindrical housing having a closed upper end, the cylindrical housing being fixedly inserted in a lower portion of the chuck;

a motor fixing means having a motor receiving portion for fixing the motor at a lower portion thereof, the motor fixing means being inserted in a lower portion of the cylindrical housing;

a piston between the closed upper portion of the cylindrical housing and an upper portion of the motor, the piston being provided with a spring, a lower portion of the piston being forwarded into the motor fixing means to push and to support a rear end portion of the motor by applying a pushing force onto an upper portion of the piston; and a pushing cam provided on the upper portion of the piston for applying the pushing force by operating an external lever.

An upper portion of the cylindrical housing is inserted into the chuck and the cylindrical housing has a coupling portion with a pin hole. A lower portion of the cylindrical housing is an opening portion so that the pushing cam, the piston and the motor fixing means are inserted therein in series. At an upper portion and at a lower portion of the cylindrical housing a lever inserting hole and a screw coupling hole is provided respectively, and a lower portion of the cylindrical housing is partly opened in order to insert the motor into the cylindrical housing. The motor fixing means has a cylindrical shape having an outer diameter same as an inner diameter of the cylindrical housing. The motor fixing means is provided with an opening portion corresponding to the opening portion of the cylindrical housing, a bottom surface of the motor fixing means is provided with a position fixing hole for supporting a base portion of the motor shaft, an upper surface portion of the motor fixing means is provided with a piston inserting hole at its center, and the motor fixing means is provided with a piston inserting groove between the opening portion and the piston inserting hole for inserting the piston into the piston inserting hole. The piston is provided with an upper portion having a diameter same as an inner diameter of the cylindrical housing, a middle portion having a stepped column shape with gradually reduced diameters from the upper portion to a lower portion and a lower neck portion for necking the spring, and the spring is located between the lower neck portion and the upper portion. The pushing cam has a triangular pillar with rounded edges and a lever inserting hole for inserting an external lever. Also, the piston is provided with a motor supporting groove at a bottom center portion of the neck portion in which the rear portion of the motor is inserted.

According to another embodiment of the present invention, the apparatus for inserting a shaft of a motor into a gear includes:

a hand press having a substrate with a bottom portion, a vertical portion and a ceiling portion, a chuck suspended by the ceiling portion and a handle for moving the chuck in an up/down direction attached to the substrate;

a means for fixing gear formed on the bottom portion of the hand press;

a cylindrical housing having a closed upper end, the cylindrical housing being fixedly inserted in a lower portion of the chuck;

a motor fixing means having a motor receiving portion for fixing the motor at a lower portion thereof, the motor fixing means being inserted in a lower portion of the cylindrical housing;

a piston between the closed upper portion of the cylindrical housing and an upper portion of the motor, the piston being provided with a spring, a lower portion of the piston being forwarded into the motor fixing means to push and to support a rear end portion of the motor by applying a pushing force onto an upper portion of the piston; and air supplying means for supplying air to provide a space between an upper surface of the piston and an upper inner surface of the cylindrical housing with an air pressure. The apparatus may further comprise a motor shaft supporting means located at a bottom portion of the cylindrical housing, the motor supporting means being able to move into and from an inner portion of the motor fixing means by supplying an air pressure thereto. Preferably, the motor shaft supporting means is provided with a receiving portion having a predetermined depth positioned at a lower outer periphery of the motor fixing means and with a penetration hole from the receiving portion to a position fixing hole for supporting the base portion of the motor shaft, a motor shaft supporting rod with a spring being inserted in the penetration hole from the receiving portion to the fixing hole, a rear end of the motor shaft supporting rod being provided with a spring secession preventing portion and a front portion having a pin inserted therein, and the front end thereof being provided with a supporting groove having a curvature radius identical with a curvature radius of the shaft of the motor.

Also, the apparatus may have an air pressure producing means for generating the air pressure applied to the motor supporting means, the air pressure producing means comprising an air cylinder provided at a lower portion of the cylindrical housing and an air supplying hose connected to an inner portion of the air cylinder.

Using the apparatus for inserting a rotation shaft of small-sized motor into gear according to this invention, the rotation shaft may be inserted into the gear simply, speedily and accurately.

BRIEF DESCRIPTION OF THE DRAWINGS

The invention, both as to its organization and method of operation, together with further objects and advantages thereof may best be understood by reference to the following description taken in connection with the accompanying drawings, in which:

FIG. 2 is a cross-selectional view of assembled condition for the apparatus shown in FIG. 1;

FIG. 3 is a cross-selectional view similar with FIG. 2, explaining the operation to insert the rotation shaft of small-sized motor into the gear;

FIG. 6 is a cross-selectional view of assembled condition for the apparatus shown in FIG. 5;

FIG. 7 is a cross-selectional view similar with FIG. 6, explaining the operation to insert a rotation shaft of small-sized motor into the gear;

FIG. 11 is a cross-selectional view of assembled condition for the apparatus shown in FIG. 10;

FIG. 12 is a cross-selectional view similar with FIG. 11, explaining the operation to insert the rotation shaft of small-sized motor into the gear.

DESCRIPTION OF THE PREFERRED EMBODIMENT

Figure 1:
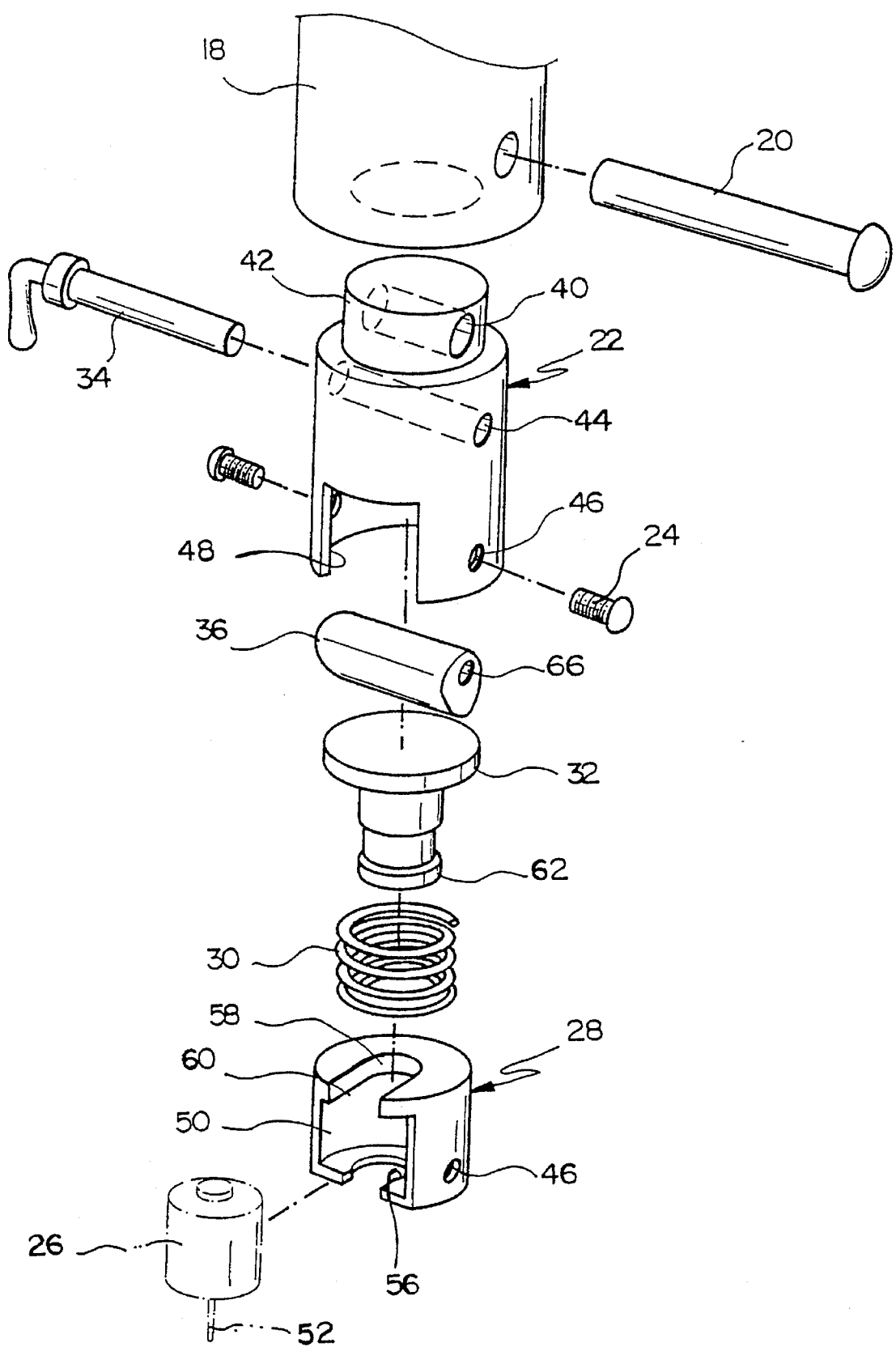
FIG. 1 is an exploded view illustrating an apparatus for inserting a rotation shaft of small-sized motor into a gear according to a first embodiment of the present invention.

Hereinafter, the present invention will be explained in detail with reference to the accompanying drawings.

FIGS. 1 to 4 show an apparatus for inserting a rotation shaft 52 of a small-sized motor 26 into a gear, in accordance with a first embodiment of the present invention.

The apparatus of the present invention includes a hand press 10 having a substrate 12 with a bottom portion, a vertical portion and a ceiling portion, a chuck 18 suspended by the ceiling portion and a handle 16 for moving chuck 18 in an up/down direction attached to the substrate, a gear fixing member 14 for fixing gear (not shown) formed on the bottom portion of hand press 10, a cylindrical housing 22 having a closed upper end, cylindrical housing 22 being fixedly inserted in a lower portion of chuck 18 and a motor fixing member 28 having a motor receiving portion for fixing motor 26 at a lower portion thereof. Motor fixing member 28 is fixed to cylindrical housing 22 by fixing screws 24 and inserted in a lower portion of cylindrical housing 22. The apparatus also includes a piston 32 between the closed upper portion of cylindrical housing 22 and an upper portion of the motor. Piston 32 is provided with a spring 30 and a lower portion of piston 32 is forwarded into motor fixing member 28 to push and to support a rear end portion of motor 26 by applying a pushing force onto an upper portion of piston 32. A pushing cam 36 is provided on an upper portion of piston 32 for applying the pushing force by operating an external lever 34.

As shown in these figures, a gear fixing member 14 on a substrate 12 of hand press 10 is provided with a gear fixing groove 38 at an upper portion thereof. Cylindrical housing 22 is inserted into a lower portion of chuck 18 which is moved in the upward/downward directions by adjusting handle 16, and is coupled thereto by coupling pin 20.

An upper portion of cylindrical housing 22 is inserted into chuck 18. Cylindrical housing 22 has a coupling portion with a pin hole and a lower portion of cylindrical housing has an opening portion so that pushing cam 36, piston 32 and motor fixing member 28 are inserted therein in series. At an upper portion and at a lower portion of cylindrical housing 22, a lever inserting hole 44 and a screw coupling hole 46 are provided respectively, and a lower portion of cylindrical housing 22 has a partial opening 48 in order to insert motor 26 into cylindrical housing.

Motor fixing member 28 has a cylindrical shape having an outer diameter same as an inner diameter of cylindrical housing 22. Motor fixing member 28 is provided with an opening portion 50 corresponding to opening portion 48 of cylindrical housing 22. A bottom surface of motor fixing member 28 is provided with a position fixing hole 56 for supporting a base portion of motor shaft 52. An upper surface portion of motor fixing member 28 is provided with a piston inserting hole 58 at its center, and motor fixing member 28 is provided with a piston inserting groove 60 between opening portion 50 and a piston inserting hole 58 for inserting piston 32 into piston inserting hole 58.

As shown in FIGS. 1 and 2, piston 32 is provided with an upper portion having a diameter same as an inner diameter of cylindrical housing 22, a middle portion having a stepped column shape with gradually reduced diameters from the upper portion to a lower portion and a lower neck portion 62 for necking spring 30. Lower neck portion 62 fixes a rear portion of motor 26 at the state that motor 26 is inserted in motor fixing member 28. Spring 30 is located between lower neck portion 62 and the upper portion.

At a bottom portion of lower neck portion 62, a motor supporting groove 64 is provided at its center portion, in which a rear portion of motor 26 is inserted.

Pushing cam 36, as shown in FIG. 1, has a triangular pillar having rounded edges and has a lever inserting hole 66 for inserting a lever 34 is inserted. Lever 34 is eccentrically inserted in piston 32 from outside cylindrical housing 22.

Figure 4:
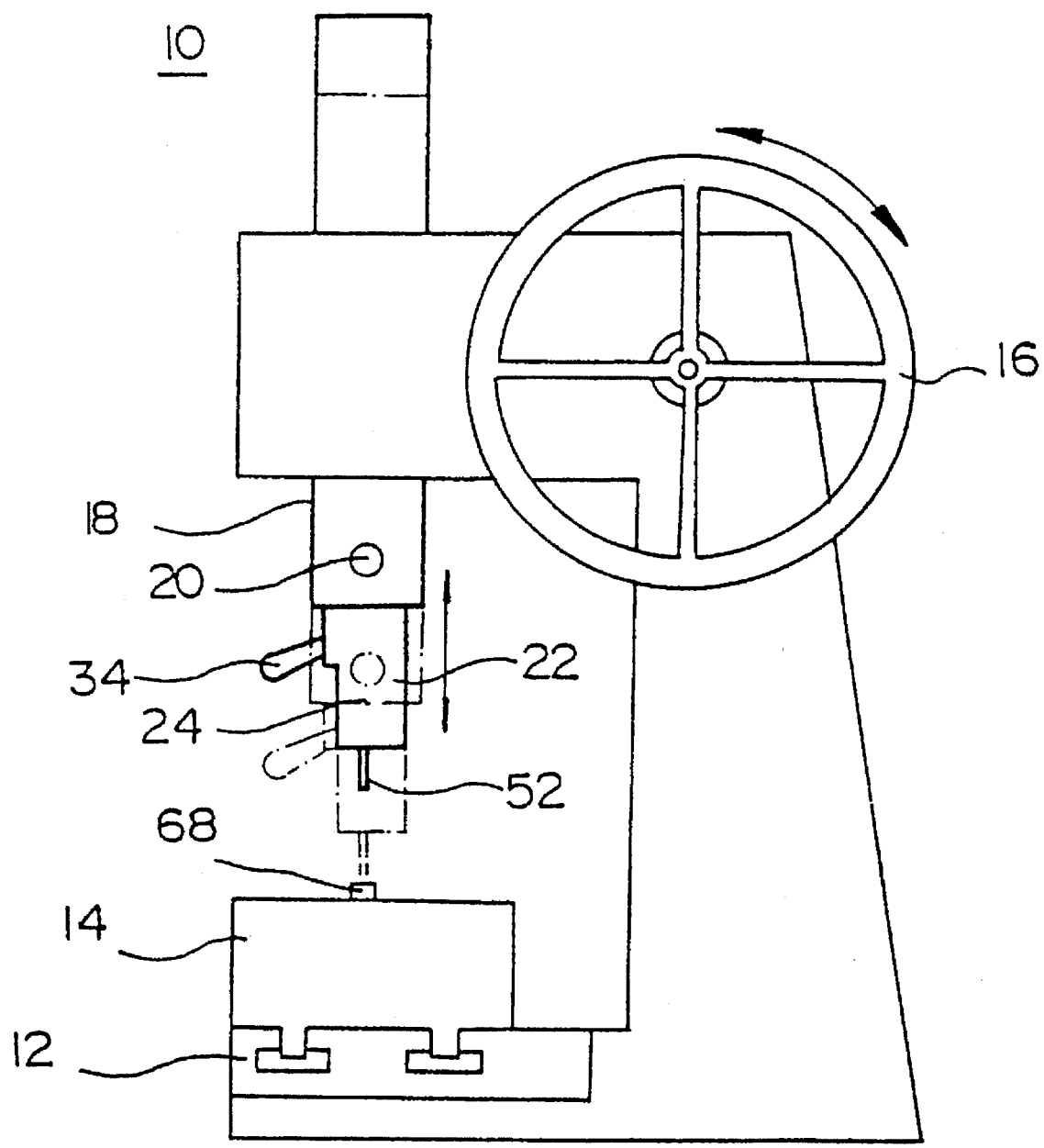
FIG. 4 is a diagram showing that the apparatus for inserting the shaft into gear according to first embodiment of this invention is incorporated with the conventional hand press.

Next, the operation for inserting a rotation shaft of motor 26 will be explained with reference to FIGS. 3 and 4.

As can be seen from these figures, a gear is inversely inserted in gear groove 38 of gear fixing member 14 on substrate 12 of hand press 10. Motor 26 is inserted in motor fixing member 14, whose upper end portion is inserted in a lower portion of chuck 18 which can move by the rotation operation of handle 34 provided at an upper portion of substrate 12 of hand press 10. Accordingly, rotation shaft 52 of motor 26 and a bottom portion 54 thereof is inserted in position fixing hole 56 provided at a bottom portion of motor fixing member 28.

Thereafter, by operating lever 34 provided at one side of cylindrical housing 22, piston 34 is pushed down so that a rear portion of motor 26 may be inserted in a motor supporting groove 64 provided at a bottom portion of piston 34. At this state, when chuck 18 is lowered by rotating handle 16, rotation shaft 52 of motor 26 is inserted into gear 68 located on substrate 12 of gear fixing member 14.

At this state, when lever is released, the force of pushing cam 36 applied on piston 32 is eliminated and piston 32 rises due to the restoring force of spring 30. Then, when handle 16 is rotated in an opposite direction to move chuck 18 upwardly, gear 68 with rotation shaft 52 inserted therein is removed from gear groove 38. Then, motor 16 with gear 68 is removed from the apparatus.

Accordingly, inserting a rotation shaft in the gear may be easily performed.

Next, an apparatus for inserting a shaft of a small-sized motor into a gear according to a second embodiment will be explained in detail hereinafter with reference to FIGS. 5 to 9.

As can be seen in FIGS. 5 to 9, the apparatus includes a gear fixing member 114 mounted on a substrate 112;

a cylindrical housing 122 fixedly inserted by a coupling pin 120 in a lower portion of a chuck 118 moving up and down by a manipulation of a handle 116;

a motor fixing member 128 having a motor receiving portion 126 for fixing a motor at a lower portion thereof, motor fixing member 128 being inserted in a lower portion of cylindrical housing 122;

a piston 132 between a closed upper portion of housing 122 and an upper portion of the motor, piston 132 being provided with a spring 130, a lower portion of piston 132 being forwarded into motor fixing member 128 to push and to support a rear end portion of the motor by applying a pushing force onto an upper portion of piston 132;

an air hose 134 for supplying an air pressure into space existed between an upper portion of piston 132 and an upper portion of housing 122; and a motor shaft supporting member 140 located at a bottom portion of cylindrical housing 122, motor supporting member 140 being able to move into and out of an inner portion of motor fixing member 128 by supplying an air pressure thereto.

Gear fixing member 114, as shown in FIG. 6, has a gear fixing groove 142 on an upper center portion thereof.

Cylindrical housing 122 is formed with an upper portion 146 housing a pin hole 144 in order to be inserted into a lower portion of chuck 118 and formed in one body with chuck 118 and formed in one body with housing 122. Housing 122 has a lower portion of an opening portion in order for packing 188, piston 132 to be inserted in turn from the lower portion thereof. And one side of housing 122 is partly opened in order to insert the motor 126 into housing 122.

Housing 122 also has a cylindrically stepped skirt 154 extended downwards from housing 122 and having a diameter larger than that of housing 122.

Cylindrically stepped skirt 154 is covered with a lower cover 156 on its lower portion and fixed to each other by screws 158, so that another air cylinder portion 136 is formed on skirt 154 in order for air to be injected into air cylinder portion 136.

Figure 5:
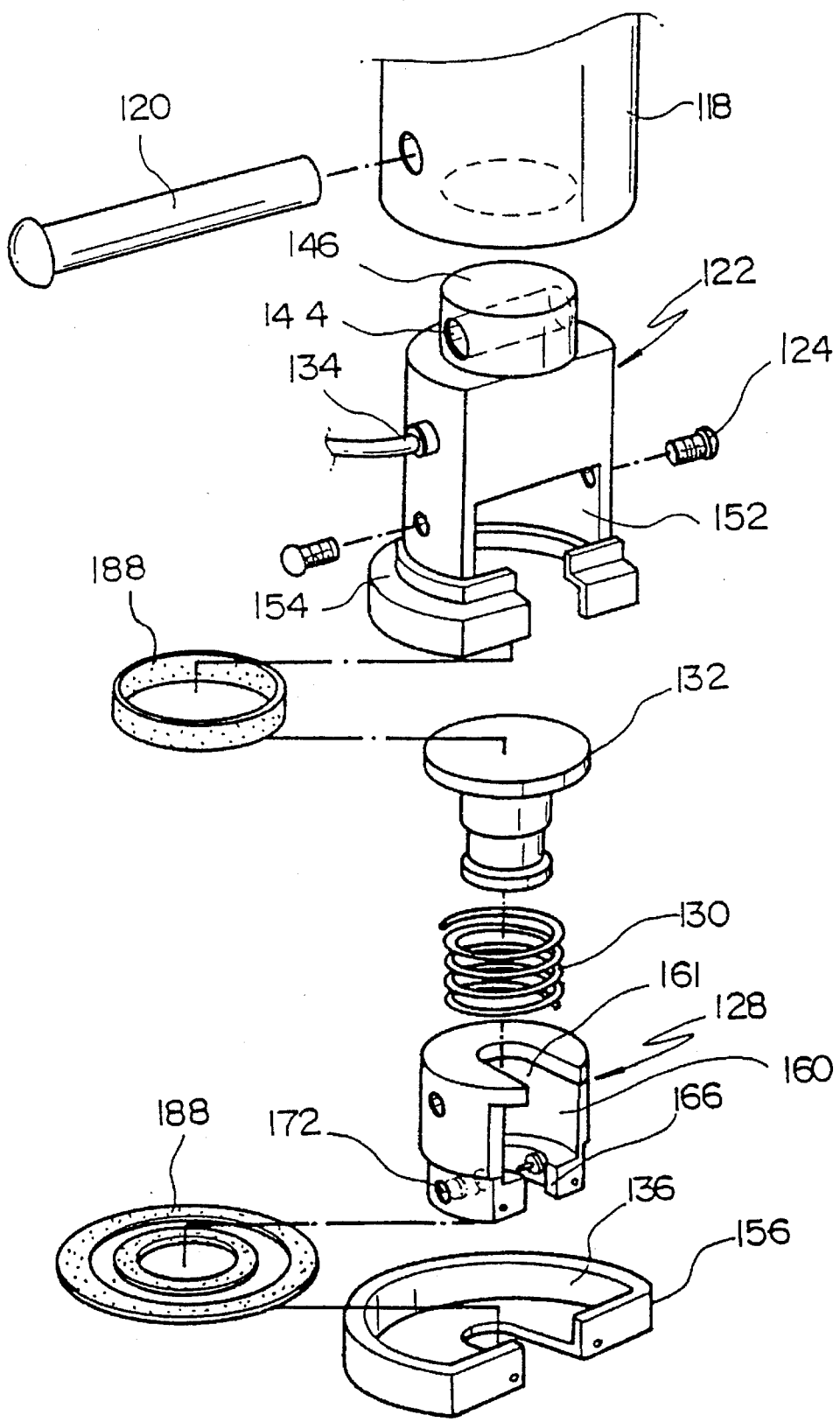
FIG. 5 is an exploded view illustrating an apparatus for inserting the rotation shaft of small-sized motor into a gear according to second embodiment of this invention.
Figure 8:
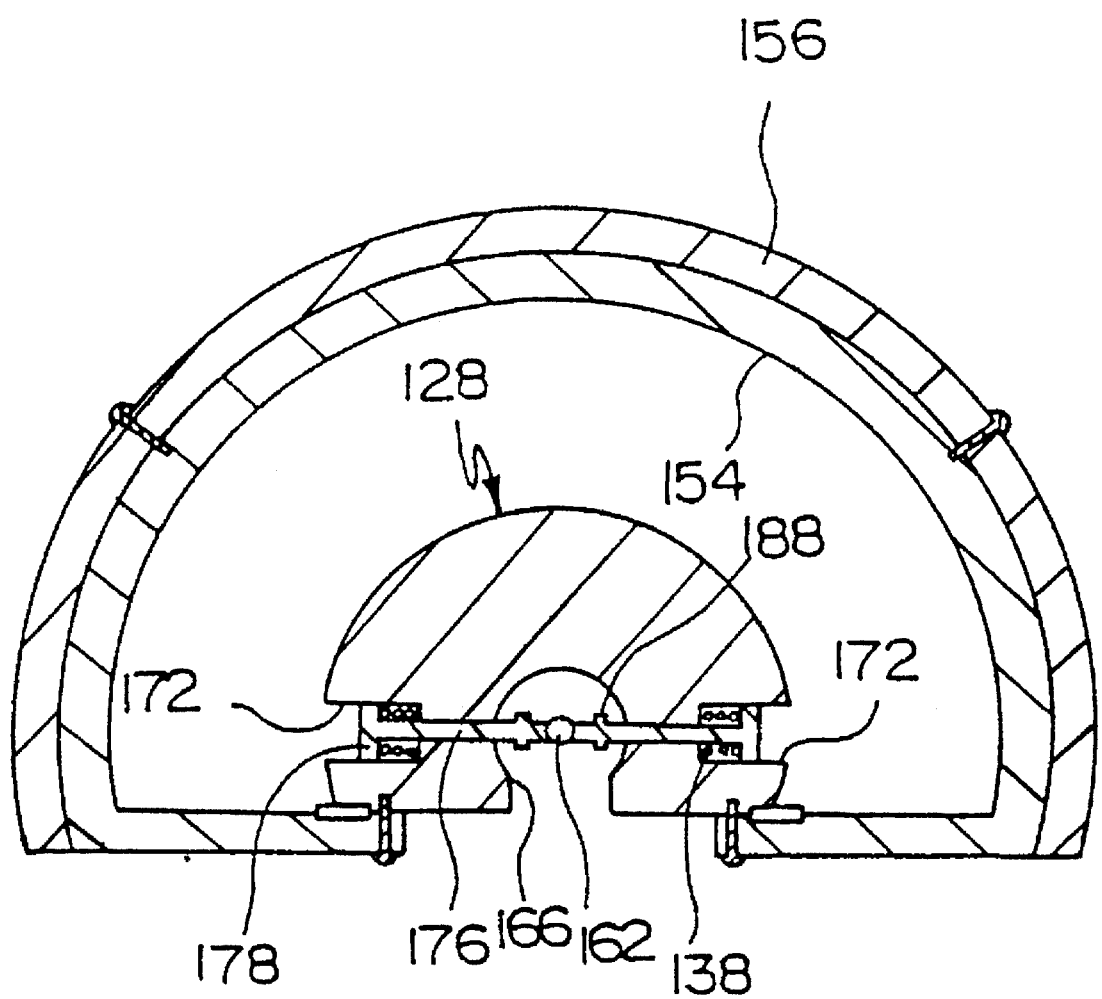
FIG. 8 is a cross-selectional view taken on line A—A of FIG. 7.

Motor fixing member 128, as shown in FIGS. 5 and 6, has a cylindrical shape having an outer diameter same as the inner diameter of cylindrical housing 122. At a front portion of motor fixing member 128, an opening portion 160 corresponding to opening portion 152 of cylindrical housing 122 and having the same object is provided. Further, at a bottom portion of motor fixing member 128, a position fixing hole 161 is provided for holding a base portion 164 of motor shaft 162. The upper portion of motor fixing member 128 is provided with a piston inserting hole at a center portion and a piston inserting groove 170 is provided between piston inserting hole 161 and opening portion 160 motor fixing member 128.

Motor shaft supporting unit 140 is positioned on the outer periphery of position fixing hole 166 which is formed at a center portion of the bottom of motor fixing member 128. A receiving portion 172 having a predetermined depth is formed which is directed from an outer periphery portion of motor fixing member 128 to a center portion. A penetration hole 174 from receiving portion 172 to position fixing hole 166 is formed, in which a motor shaft supporting rod 176 with a spring 138 is elastically inserted. Motor shaft supporting rod 176 is provided with spring releasing preventing neck portion 178 at its one end. At a front portion of motor shaft, supporting rod 176 is provided with a protruding pin 180 inserted therein. The front end of motor shaft supporting rod 176 has a supporting groove having a same arc diameter as a diameter of motor shaft 162.

As shown in FIGS. 5 and 6, piston 132 is provided with an upper portion having a diameter same as an inner diameter of cylindrical housing 122, a middle portion having a stepped column shape with gradually reduced diameters from the upper portion to a lower portion and a lower neck portion 184 for necking spring 130. Lower neck portion 184 fixes a rear portion of motor 126 at the state that motor 126 is inserted in motor fixing member 128. Spring 130 is located between lower neck portion 184 and the upper portion.

At a bottom portion of lower neck portion 184, a motor supporting groove 186 is provided at its center portion, in which a rear portion of motor 126 is inserted.

Packings 188 are provided in the gaps between cylindrical housing 122 and motor fixing member 128, between lower stepped portion 154 of cylindrical housing 122 and bottom cover 156, and between the bottom surface of motor fixing member 128 and the bottom surface of bottom cover 122 so as to prevent an air leakage.

Hereinafter, the inserting operation of inserting a rotation shaft of a small-sized motor into a gear by the apparatus according to the second embodiment of this invention will be explained, referring to FIG. 9.

Figure 9:
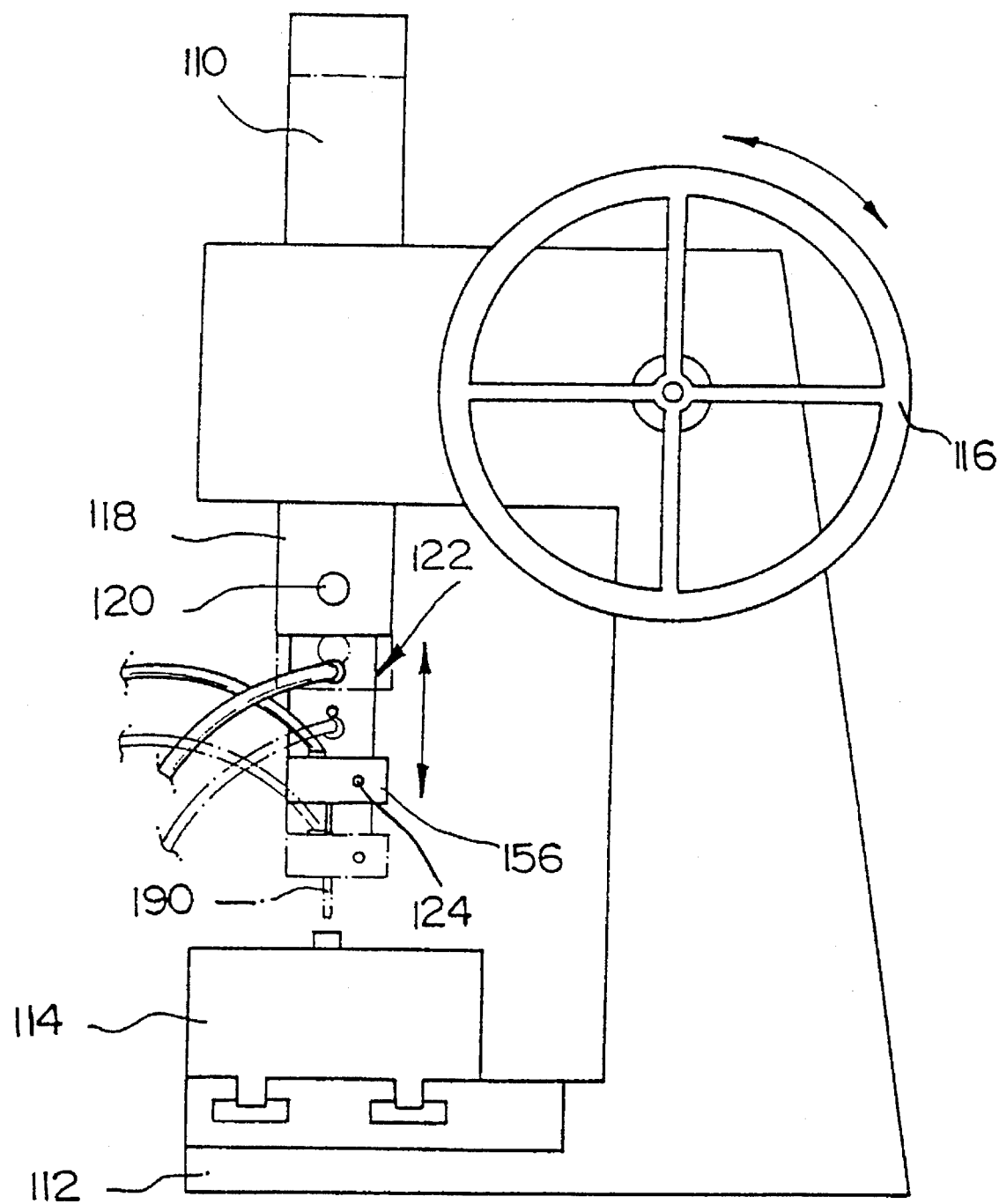
FIG. 9 is a diagram showing that the apparatus for inserting the shaft into gear according to second embodiment of this invention is incorporated with the conventional hand press.

As shown in FIG. 9, after a gear 190 is reversely inserted and fixed in gear fixing groove 138 on upper surface of gear fixing member 114 disposed on substrate 112 of hand press 110, motor 126 is inserted in motor fixing member 128 of the apparatus fitted at the lower end of chuck 118 which is disposed above substrate 112 of hand press so that motor shaft 162 and base 164 thereof are fitted in position determining hole 166 on the bottom surface of motor fixing member 128. Rotation shaft support means 140 is operated by applying air pressure to air cylinder 136 defined by housing 122 and lower cover 156, so that motor shaft support rod 176 supports rotation shaft 162. And then, piston 132 is descended by applying air pressure to the space above piston 132 through air injection hole 148 at the upper surface of housing 122 until the rear end of motor 126 is inserted in the motor support recess 86 formed at the lower surface of threshold 184 at the lower end of piston 132. And then, this installed chuck 118 is descended by rotating handle 116, and thereby rotation shaft 162 is inserted and urged into gear 170 put on gear fixing member 114 on substrate 112. From this state, by the removing of air pressure from air cylinder 136 formed between the lower end of housing 122 and lower cover 156, motor shaft support 162 is restored to its initial state by the restoring force of spring 138, and when air pressure is removed from the inner upper surface of housing 122, the force pressing piston 132 is removed and at the same time piston 132 ascends by the restoring force of spring 130. And then, chuck 118 is ascended by rotating handle 116 on hand press 110 in the opposite direction to that in the above described process, so that gear 190 inserted in rotation shaft 162 is coming out from gear fixing groove 142, and then motor in which gear 190 is fitted is easily extracted in the state that the chuck is lifted up. Therefore, a gear can be easily inserted and fixed in the rotation shaft of a motor by the above process.

Hereinafter, an apparatus for inserting a rotation shaft of a motor into a gear according to the third embodiment of the present invention will be described referring to FIGS. 10 to 13.

Figure 10:
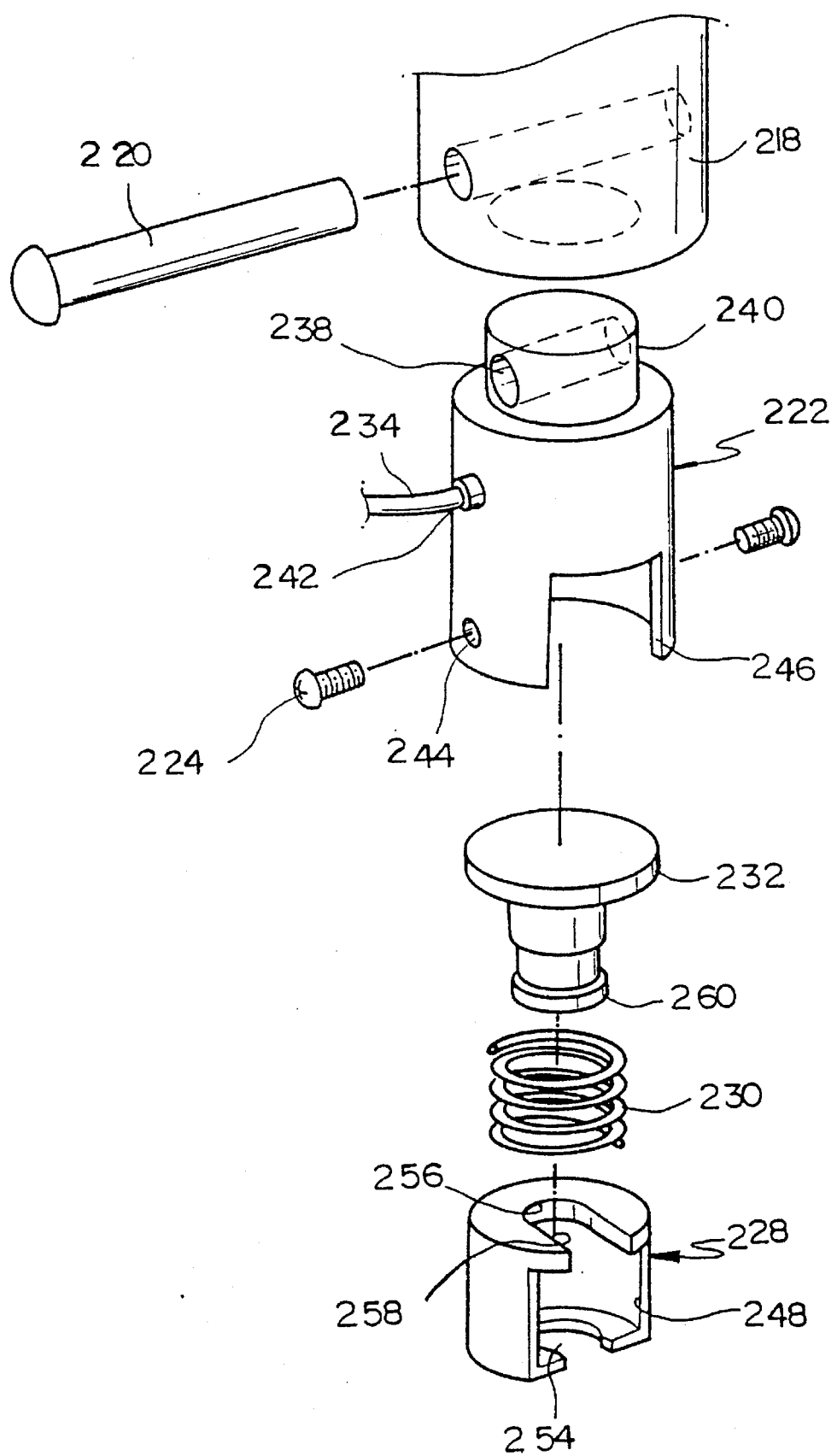
FIG. 10 is an exploded view illustrating an apparatus for inserting the rotation shaft of small-sized motor into a gear according to third embodiment of this invention.

The apparatus for inserting a rotation shaft of a motor includes, as shown in FIGS. 10 and 11, a gear fixing member 214 disposed on the upper surface of substrate 212 of hand press 210, a cylindrical housing 222 fitted in the lower end of chuck 218 ascending or descending by the operation of handle 216 and fixed by fixing pin 220, and motor fixing member 228 fitted in the inner lower part of housing 222 and fixed by fixing screw 224 to receive motor 226. The apparatus further comprises a piston 232 deposed between the inner upper surface of housing 222 and the upper surface of motor fixing member, the lower end of which proceeds into motor fixing member 228 so as to urge and support the rear end of the received motor 226 when the upward pressing force is applied by spring 230, and an air hose for applying an air pressure on the upper surface of piston 232 to press it. As shown in FIG. 12, gear fixing member 214 disposed on the upper surface of substrate 212 of hand press 210 has a gear fixing groove 236 formed at the middle of the upper surface thereof. As shown in FIGS. 10 and 11, an upper surface fitted in the lower end of chuck 218, a fixing section 240 formed incorporated therewith and having pin holes 238 formed at the outer periphery thereof, an open lower surface into which piston 232 and motor fixing member 228 are fitted to be laminated downward in order an air hose fitting hole 242 and a fitting hole 244 respectively formed at the upper part and the lower part of the outer periphery thereof, and a cut-out section 246 formed at the front surface thereof into which motor 226 can be inserted.

Motor fixing member 228 has a cylindrical shape the outer diameter of which is equal to that of housing. Another cut-out section 248, which has the same function with that of cut-out section 246 and coincides therewith, is formed at the front surface of fixing member 228. On the bottom surface of fixing member 228, a position determining hole 254 for holding base 252 of rotation shaft 250 is formed. A piston inserting hole 256 is formed at the middle of the upper surface of fixing member 228, and a piston inserting recess 258 for receiving piston 232 therein is disposed between cut-out section 248 and piston inserting hole 256.

Piston 232, as can be seen from FIGS. 10 and 11, is provided with an upper portion having a diameter same as an inner diameter of cylindrical housing 222, a middle portion having a stepped column shape with gradually reduced diameters from the upper portion to a lower portion and a lower neck portion 260 for necking spring. Neck portion 260 holds a rear portion of motor 226 at the state that motor 226 is inserted in motor fixing member 228 and prevents piston 232 from releasing upwardly. Spring 230 is inserted in an interval between neck portion 260 and an upper portion of piston 232.

The bottom portion of neck portion 260 is provided with a motor supporting groove 262 in which the rear portion of motor is inserted.

In the meantime, as shown in FIG. 11, an end of air hose 234 is coupled to an air compressor (not shown) and the other end is coupled to air hose inserting hole 242 formed on an upper portion of cylindrical housing 222.

Next, an operation for inserting a rotation shaft of a small-sized motor into gear using the apparatus according to a third embodiment of this invention will be explained with reference to FIGS. 12 and 13.

Figure 13:
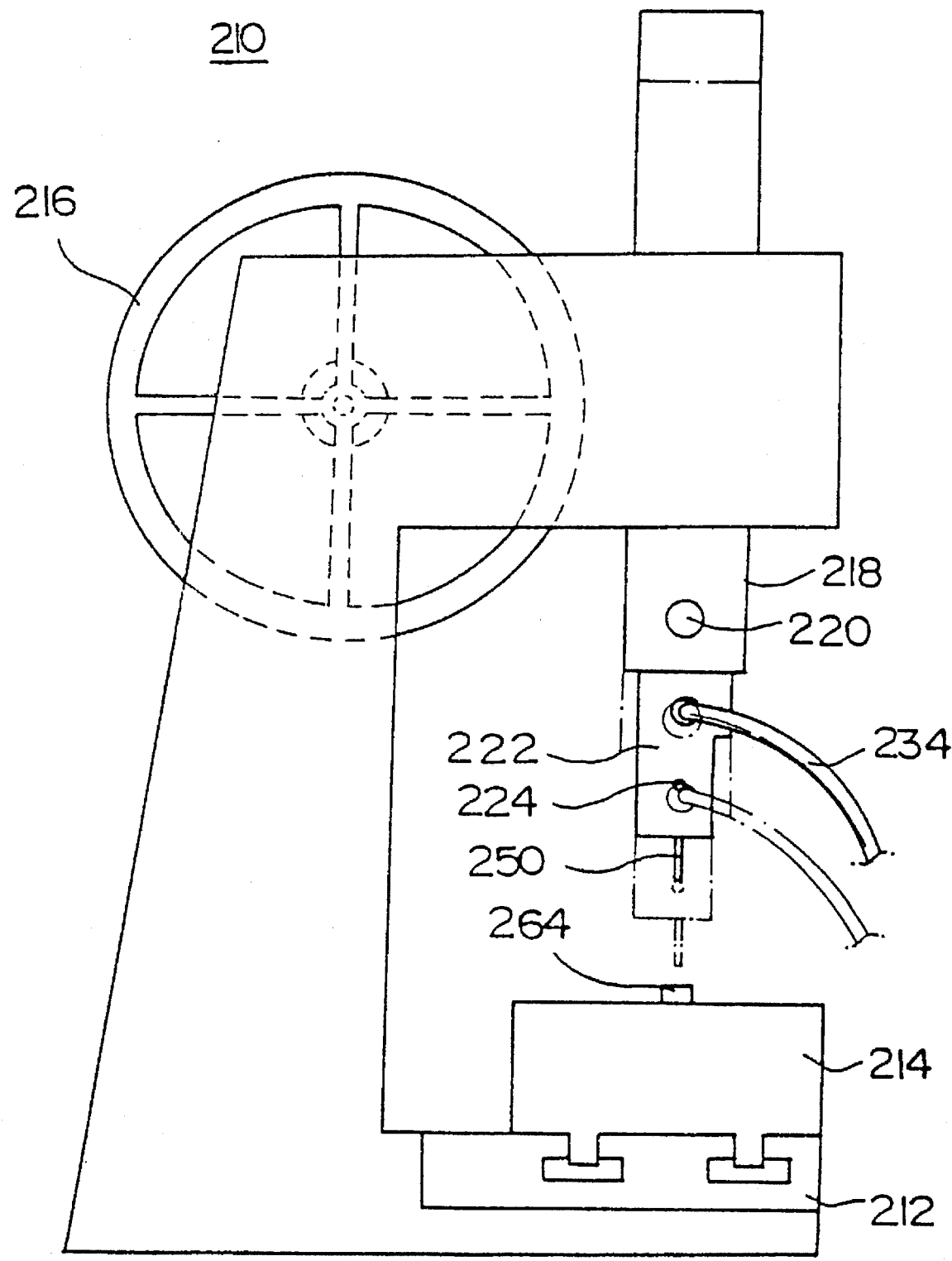
FIG. 13 is a diagram showing that the apparatus for inserting the shaft into gear according to third embodiment of this invention is incorporated with the conventional hand press.

As can be seen from FIGS. 12 and 13, a gear 264 is inversely inserted in gear groove 236 of gear fixing member 214 on substrate 212 of hand press 10. A motor 26 is inserted in motor fixing member 228, whose upper end portion is inserted in a lower portion of chuck 218 which can move by the rotation operation of handle 216 provided at an upper portion of substrate 12 of hand press 10. Accordingly, the rotation shaft of the motor and a bottom portion thereof is inserted in position fixing hole 256 provided at a bottom portion of motor fixing member 228.

Then, air is supplied into cylindrical housing 22 so that piston 232 is pushed down so that a rear portion of motor 262 may be inserted in a motor supporting groove 262 provided at a bottom portion of necking portion 160 of piston 232. At this state, when chuck 218 is lowered by rotating handle 216, rotation shaft 250 of motor 226 is inserted into gear 264 located on substrate 214 of gear fixing member 212.

At this state, when the air in cylindrical housing 222 is removed, the force applied on piston 232 is eliminated and piston 232 rises due to the restoring force of spring 230. Then, when handle 216 is rotated in an opposite direction to move chuck 218 upwardly, gear 264 with rotation shaft 252 inserted therein is removed from gear groove 236. Then, motor 226 with gear 264 is removed from the apparatus.

Using the present invention, when combining a gear with a motor shaft of a small motor, the centering can be performed correctly. Further, the inserting may be performed simply without any damages to the teeth of the gear.

It can be understood although preferred the embodiments of the invention have been described in detail above, many modifications and variations could be effected therein by one with ordinary skill in the art without departing from the spirit and scope of the invention as defined by the appended claims.

What is claimed is:

1. An apparatus for inserting a shaft of a motor into a gear, said apparatus comprising:

a hand press having a substrate with a bottom portion, a vertical portion and a ceiling portion, a chuck suspended by said ceiling portion and a handle for moving the chuck in an up/down direction attached to said substrate;

a means for fixing a gear provided on the bottom portion of said hand press;

a cylindrical housing having a closed upper end, said cylindrical housing being fixedly inserted in a lower portion of said chuck;

a motor fixing means having a motor receiving portion for fixing said motor at a lower portion thereof, said motor fixing means being inserted in a lower portion of said cylindrical housing;

a piston between the closed upper portion of said cylindrical housing and an upper portion of said motor, said piston being provided with a spring, a lower portion of said piston being forwarded into said motor fixing means to push and to support a rear end portion of said motor by applying a pushing force onto an upper portion of said piston; and a pushing cam provided on the upper portion of said piston for applying the pushing force by operating an external lever.

2. The apparatus for inserting a shaft of a motor into a gear according to claim 1, wherein an upper portion of said cylindrical housing is inserted into said chuck, said cylindrical housing has a coupling portion with a pin hole, a lower portion of said cylindrical housing is an opening portion so that said pushing cam, said piston and said motor fixing means are inserted therein in series, at an upper portion and at a lower portion of said cylindrical housing a lever inserting hole and a screw coupling hole respectively, and a lower portion of said cylindrical housing is partly opened in order to insert the motor into said cylindrical housing.

3. The apparatus for inserting a shaft of a motor into a gear according to claim 2, wherein said motor fixing means has a cylindrical shape having an outer diameter same as an inner diameter of said cylindrical housing, said motor fixing means is provided with an opening portion corresponding to said opening portion of said cylindrical housing, a bottom surface of said motor fixing means is provided with a position fixing hole for supporting a base portion of the motor shaft, an upper surface portion of said motor fixing means is provided with a piston inserting hole at its center, and said motor fixing means is provided with a piston inserting groove between said opening portion and said piston inserting hole for inserting said piston into said piston inserting hole.

4. The apparatus for inserting a shaft of a motor into a gear according to claim 1, wherein said piston is provided with an upper portion having a diameter same as an inner diameter of said cylindrical housing, a middle portion having a stepped column shape with gradually reduced diameters from the upper portion to a lower portion and a lower neck portion for necking said spring, and said spring is located between the lower neck portion and the upper portion.

5. The apparatus for inserting a shaft of a motor into a gear according to claim 1, wherein said pushing cam has a triangular pillar with rounded edges and a lever inserting hole for inserting an external lever.

6. The apparatus for inserting a shaft of a motor into a gear according to claim 1, wherein said piston is provided with a motor supporting groove at a bottom center portion of said neck portion in which the rear portion of the motor is inserted.

7. An apparatus for inserting a shaft of a motor into a gear, said apparatus comprising:

a hand press having a substrate with a bottom portion, a vertical portion and a ceiling portion, a chuck suspended by said ceiling portion and a handle for moving the chuck in an up/down direction attached to said substrate;

a means for fixing gear provided on the bottom portion of said hand press;

a cylindrical housing having a closed upper end, said cylindrical housing being fixedly inserted in a lower portion of said chuck;

a motor fixing means having a motor receiving portion for fixing said motor at a lower portion thereof, said motor fixing means being inserted in a lower portion of said cylindrical housing;

a piston between the closed upper portion of said cylindrical housing and an upper portion of said motor, said piston being provided with a spring, a lower portion of said piston being forwarded into said motor fixing means to push and to support a rear end portion of said motor by applying a pushing force onto an upper portion of said piston; and air supplying means for supplying air to provide a space between an upper surface of the piston and an upper inner surface of said cylindrical housing with an air pressure.

8. The apparatus for inserting a shaft of a motor into a gear according to claim 7, further comprising a motor shaft supporting means located at a bottom portion of said cylindrical housing, said motor supporting means being able to move into and from an inner portion of said motor fixing means by supplying an air pressure thereto.

9. The apparatus for inserting a shaft of a motor into a gear according to claim 8, further comprising an air pressure producing means for generating the air pressure applied to said motor supporting means, said air pressure producing means comprising an air cylinder provided at a lower portion of said cylindrical housing and an air supplying hose connected to an inner portion of said air cylinder.

10. The apparatus for inserting a rotation shaft of a motor into a gear according to claim 8, wherein said motor shaft supporting means is provided with a receiving portion having a predetermined depth positioned at a lower outer periphery of said motor fixing means and with a penetration hole from said receiving portion to a position fixing hole for supporting a base portion of the motor shaft, a motor shaft supporting rod with a spring being inserted in said penetration hole from said receiving portion to said fixing hole, a rear end of the motor shaft supporting rod being provided with a spring secession preventing portion and a front portion having a pin inserted therein, and the front end thereof being provided with a supporting groove having a curvature radius identical with a curvature radius of the shaft of the motor.

* * * * *